United States Patent
Dubois et al.

(10) Patent No.: US 6,497,346 B1
(45) Date of Patent: Dec. 24, 2002

(54) SELF-CLOSING MANUAL DISPENSER

(75) Inventors: Daniel Dubois, Chardonnay (FR); Eric Rossignol, Châlon sur Saône (FR)

(73) Assignee: Rexam SMT (FR)

( * ) Notice: Subject to any disclaimer, the term of this patent is extended or adjusted under 35 U.S.C. 154(b) by 0 days.

(21) Appl. No.: 09/600,682

(22) PCT Filed: Jan. 18, 1999

(86) PCT No.: PCT/FR99/00087

§ 371 (c)(1),
(2), (4) Date: Jul. 21, 2000

(87) PCT Pub. No.: WO99/37550

PCT Pub. Date: Jul. 29, 1999

(30) Foreign Application Priority Data

Jan. 22, 1998 (FR) .............................. 98 00667

(51) Int. Cl.⁷ .............................. B65D 25/40

(52) U.S. Cl. .............. 222/494; 222/212; 222/490; 264/478

(58) Field of Search .............. 222/92, 213, 394, 222/401, 490, 494, 212, 206, 215, 491, 544, 566, 571

(56) References Cited

U.S. PATENT DOCUMENTS

| | | | | | |
|---|---|---|---|---|---|
| 1,942,845 | A | * | 1/1934 | Stephens | 203/43 |
| 2,065,243 | A | * | 12/1936 | Perkins | 222/490 |
| 2,804,240 | A | * | 8/1957 | Anderson | 222/207 |
| 5,186,368 | A | * | 2/1993 | Garcia | 222/490 |
| 6,016,939 | A | * | 1/2000 | Gueret | 222/494 |

FOREIGN PATENT DOCUMENTS

| | | |
|---|---|---|
| DE | 29508151 | 9/1995 |
| EP | 0442379 B1 | 8/1991 |
| EP | 0743259 A1 | 5/1996 |
| FR | 1351565 | 12/1963 |
| GB | 1472178 | 5/1977 |
| WO | 92/12065 | 7/1992 |

* cited by examiner

Primary Examiner—Henry C. Yuen
Assistant Examiner—Patrick Buechner
(74) Attorney, Agent, or Firm—Ostrolenk, Faber, Gerb & Soffen, LLP

(57) ABSTRACT

A manual dispenser dispenses a liquid substance by pressure, and automatically closes in the absence of pressure. The dispenser has a push button for controlling an aerosol valve or pump, or a stopper for a receptacle having flexible, compressible walls. The dispenser is characterized in that it comprises a nozzle (3) with an elastically deformable distribution slot (7) which nozzle is integrated by molding into a relatively rigid body (1).

14 Claims, 3 Drawing Sheets

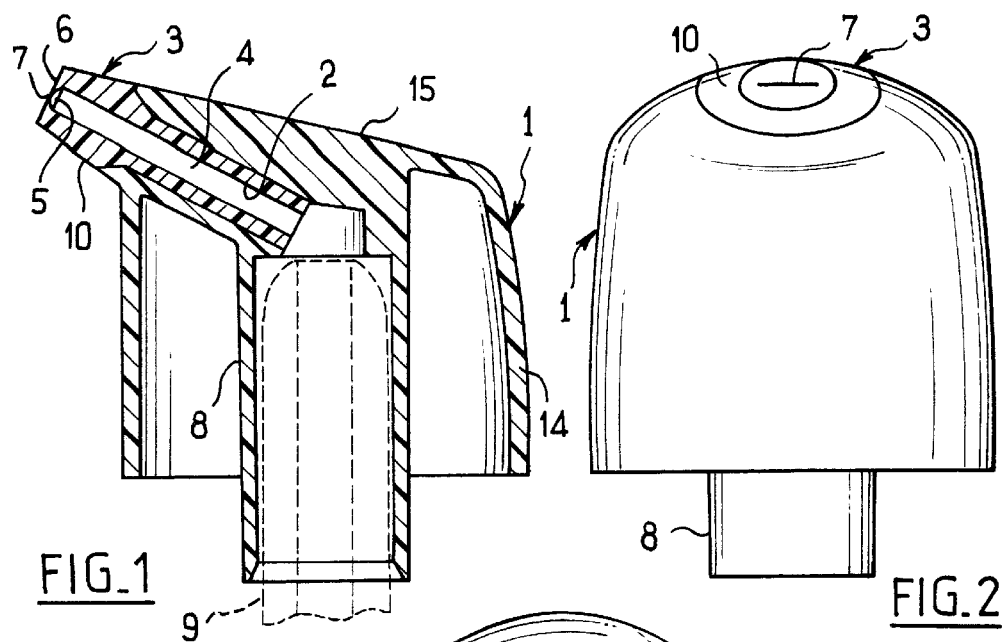
FIG_1
FIG_2
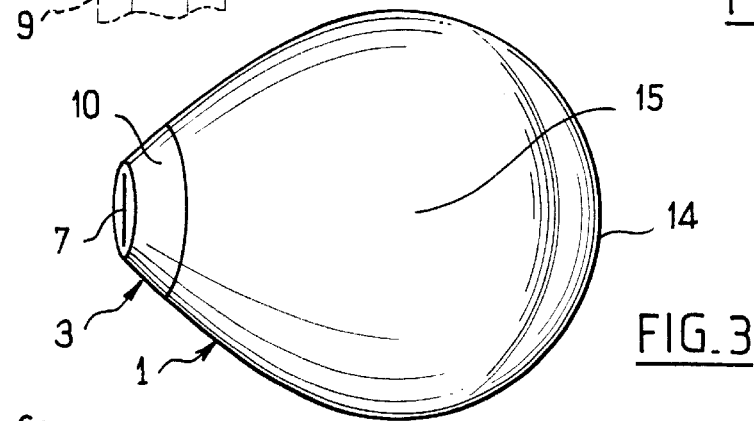
FIG_3
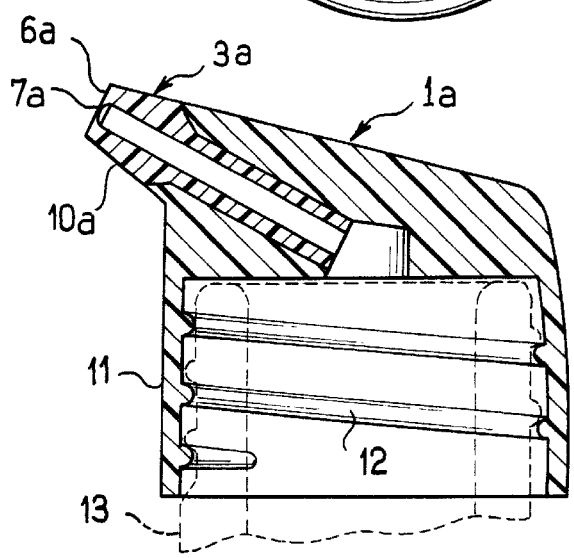
FIG_4

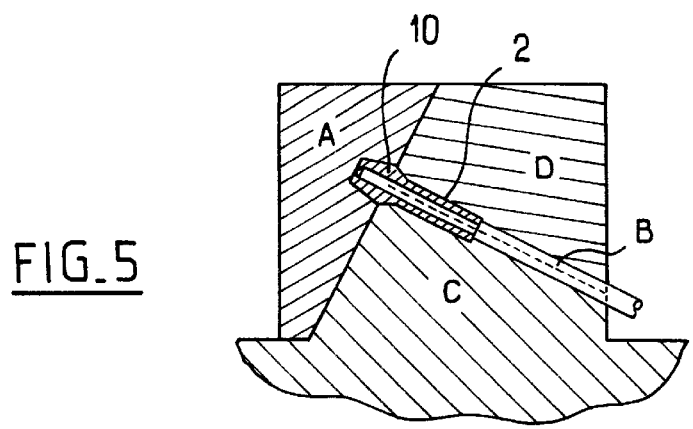
FIG_5
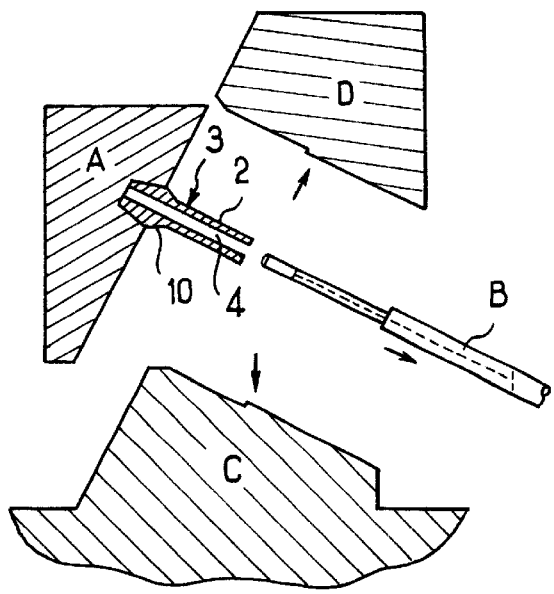
FIG_6
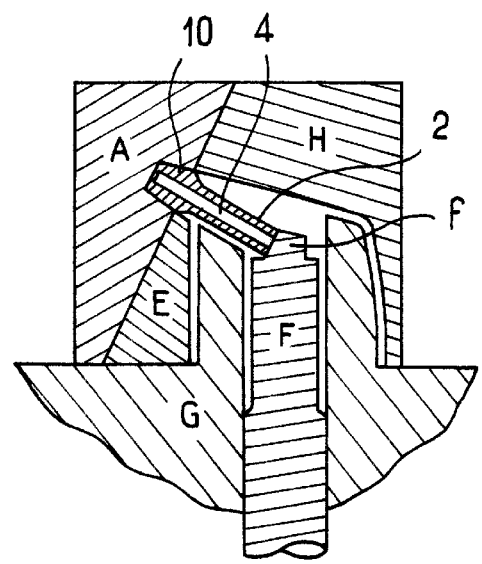
FIG_7

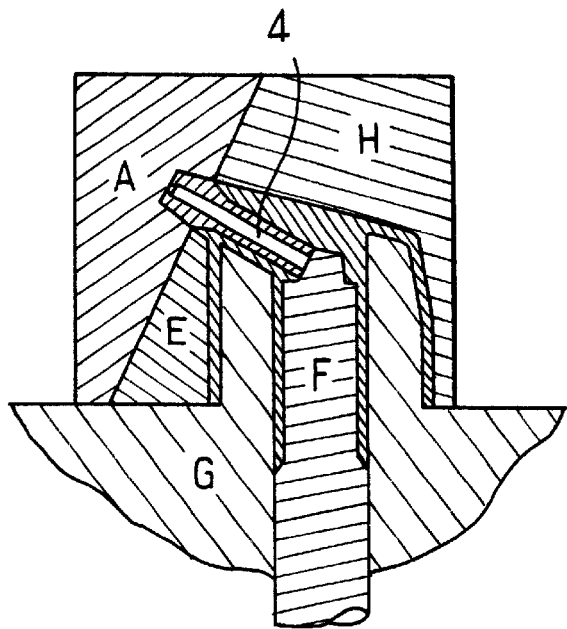
FIG_8
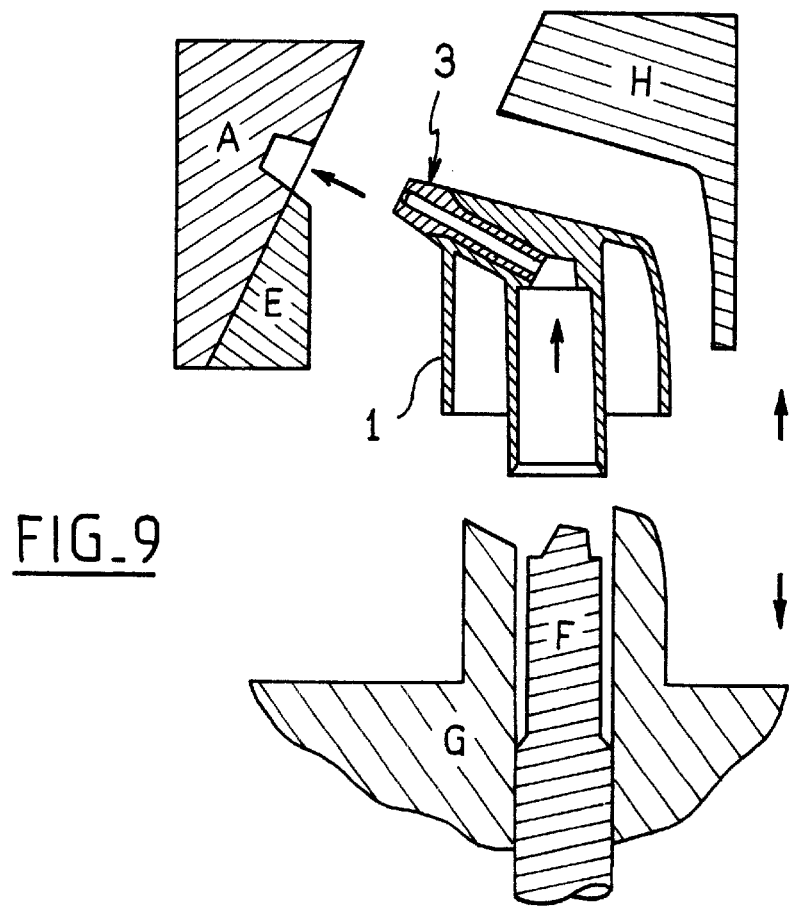
FIG_9

SELF-CLOSING MANUAL DISPENSER

The present invention relates to the packaging industry and to the plastics moulding industry.

It is aimed more specifically at the dispensing of fluid substances: liquids, emulsions, gels, particularly cosmetic or pharmaceutical, conveyed by pressure into a discharge duct the outlet of which is closed automatically in the absence of pressure, so as to avoid deterioration of the substance remaining in the duct and to ensure that the discharge orifice remains clean. It relates most specifically to closure means employing an elastic diaphragm pierced with a slit.

At rest, the walls of the slit press elastically against one another and close the duct. When a dispensing push-button controlling an aerosol valve or a pump is pressed, or if pressure is applied to a container with compressible flexible walls, such as a tube or pouch, sealed by a stopper equipped with such a duct, the substance ejected under pressure parts the walls or lips of the slit so that it can be dispensed. As soon as the pressure ceases, the slit closes back up and closes the discharge duct.

BACKGROUND OF THE INVENTION

Such a self-closing device is described particularly in the BOUET French patent number 1 351 565 in its application to flexible bottles or tubes.

According to this patent, the dispensing slit is cut in a thin wall that closes the neck and is formed at the time of moulding from the material of the container. When this device needs to be adapted to a push-button or to a stopper that is screwed on or forcibly inserted into or onto the neck of a container, then a material that can withstand the mechanical stresses of fitting and retaining the stopper or of actuating the push-button must be used to form the body. Such material does not satisfy the elasticity requirements of the dispensing slit. It is therefore necessary to use two different materials for the slit and for the body. It has already been proposed, for example in documents EP 0 743 259 A and 0 442 379 A, for a container stopper comprising a slit membrane to be produced by a two-shot injection-moulding method. However, a slit diaphragm such as this needs a very special and wide configuration of stopper which is well suited to the dispensing of highly viscous liquids or pastes (such as a toothpaste or gel) but is rather ill-suited to the dispensing of more fluid substances, especially those whose release is usually controlled by a system of the aerosol valve type, for which a dispensing nozzle that consists of an elongate tubular passage is preferred. In the prior art, a nozzle of this kind is illustrated by document GB 1 472 178, and consists of a passage moulded in the body transversely to an axial central duct (sitting on the hollow pump- or valve-actuating stem), the entire assembly being produced by moulding in a body which also has an upper surface for pressing on and a peripheral skirt.

If there is the desire to equip such a nozzle with a self-closing slit, the solution of producing a slit diaphragm by two-shot injection moulding is not suitable, as has been seen. From another viewpoint, if the nozzle is made separately and as a single piece with an end part that comprises the self-closing slit made of a material that is flexible enough for this, then the problem of incorporating the slit-comprising nozzle into the body of the container arises. The problem is that if such a nozzle is simply inserted into a housing in the body, then the retaining forces need to be higher than the forces tending to expel the nozzle under the pressure of the fluid substance being dispensed. This leads to the need for precise dimensioning of the nozzle and of the housing in order to ensure correct retention without deformation of the nozzle. It is difficult to achieve such precision under mass-production industrial moulding conditions, particularly given gradual mould wear.

SUMMARY OF THE INVENTION

The object of the invention is a self-closing dispenser which does not exhibit such drawbacks and lends itself well to industrial manufacture at competitive cost.

The subject of the invention is a manual dispenser of fluid substances using pressure, which closes automatically in the absence of pressure, having a push-button for controlling an aerosol valve or pump type, or a stopper for a compressible flexible-walled container type, of the kind which has an elastically deformable self-closing dispensing slit incorporated by moulding into a relatively rigid body, characterized in that the slit is made at one end of a one-piece nozzle made up of an elongate tubular element made of a relatively flexible and elastic material, which is incorporated by moulding into the said body.

The tubular element advantageously ends in a wall through which the said self-closing slit partially passes; advantageously, this wall has a dome-shaped interior face, and it may have a flat exterior face.

It is advantageous for the slit to be formed in a slit bulging head of the nozzle, which head is clear of the body and extends the shape thereof, so as to leave the material of the nozzle free to act elastically without the constraint of being closely surrounded by the rigid material of the body.

Advantageously, the body has an axial duct into which the nozzle or an extension thereof opens non-axially; the body also has an upper surface for pressing on and a peripheral skirt, and is designed to have an axial direction of release from the mould.

As a preference, the nozzle points upwards and is designed so as to make an obtuse angle with the said axial direction, so as to make moulding easier, as will be seen later.

In practice, the nozzle may be made of an elastomer of the ethylene-vinyl acetate type, and the body may be made of a polymer of the polypropylene type.

Another subject of the invention is a method of manufacturing such a dispenser, characterized in that the nozzle is first moulded on its own, and then transferred into the body mould so that it can be incorporated into the body when the dispenser is moulded, and the end of the nozzle of the dispenser thus formed is then slit, either in the mould or as a separate operation.

DETAILED DESCRIPTION OF THE DRAWINGS

A better understanding of the invention may be had from the detailed description of the appended drawings which depict two embodiments of the invention chosen simply by way of example from numerous embodiments, adaptations and variants that might be envisaged by a competent technician.

In these drawings:

FIG. 1 is a diagrammatic view in axial section of a push-button for controlling an aerosol valve or a pump, according to the invention, FIG. 2 is a view in front elevation of the push-button of FIG. 1;

FIG. 3 is a view from above of the same push-button;

FIG. 4 is a view similar to that of FIG. 1, of a container stopper, according to the invention;

FIG. 5 depicts in section that part of the mould that is used for moulding the nozzle;

FIG. 6 depicts the release from the mould of the nozzle produced in FIG. 5;

FIG. 7 depicts the installing of that part of the mould that is used for moulding the body;

FIG. 8 depicts the moulding of the body;

FIG. 9 depicts the releasing of the body from the mould.

DESCRIPTION OF THE PREFERRED EMBODIMENTS

In these figures, the elements which correspond are denoted by the same numerical references, possibly given an index. In order to make the drawings clearer, the respective proportions and dimensions of these elements may not have been respected. The push-button depicted in FIGS. 1 to 3 and 5 to 9 is made of one piece and formed by overmoulding a relatively rigid body 1 around the lower part 2 of a relatively elastic elongate tubular nozzle 3. The internal passage 4 of the nozzle ends in a dome 5 in a wall 6 that has a flat exterior face, pierced with a slit 7. The opposite end of the nozzle opens into an axial tubular extension 8 of the body 1 that is called upon to house the end of the hollow actuating stem 9 of an aerosol valve or of a pump, this stem being shown in broken line. The exterior part or head 10 of the nozzle 3 is completely clear of the body 1. The slit 7 does not therefore experience the constraint of being surrounded by the body 1 and can react elastically to the influences of a fluid substance conveyed under pressure by the passage 4, to open and then close again automatically when the pressure ceases. As known per se, the body 1 has a more or less cylindrical and possibly domed peripheral skirt 14 connecting, at the top, with a surface 15 for pressing on, which allows a downward pressure to be exerted with the fingers. The body is designed to allow axial release from the mould.

The nozzle 3 is arranged facing obliquely upwards, and the surface is for pressing on is inclined.

In the stopper depicted in FIG. 4, the elements which correspond to those of the push-button of FIGS. 1 to 3 are denoted by the same numerical references, but given the index a. The lateral skirt 11 of the body 1a has internal screwthreads 12 intended to cooperate with the screwthread of the neck 13 of a container, shown in broken line.

FIGS. 5 to 9 illustrate the production of the dispenser of FIG. 1.

First of all (FIG. 5) the nozzle 3 is moulded in a first moulding part of the mould, which part is made up of the parts A, C, D and B (pin or needle for forming the internal passage 4).

In a second stage (FIG. 6), the pin B, then the part C and D for moulding the bottom 2 of the nozzle are removed, leaving the nozzle 3 housed by its head 10 in the part A.

In a third stage (FIG. 7), the part A of the tooling, with the nozzle 3, is transferred into another moulding area part made up of the parts E, F, G and H. Transfer may be a translational or rotational movement within the mould. The axial pin F presses, via an appropriate stub f against the bottom 2 of the nozzle and thus seals off the passage 4.

In a fourth stage (FIG. 8), the body 1 is injected without filling the cavity 4, because of the aforementioned sealing-off.

Finally, release form the mould is achieved (FIG. 9) by withdrawing A and E, parting the mould in the axial direction between H and G, and then driving the part 1 off the pins F and G.

What is claimed is:

1. A manual dispenser for dispensing fluid substances under pressure and which automatically closes in the absence of pressure being applied thereto, comprising:
    a relatively rigid body member for being secured onto a container holding the fluid to be dispensed; and
    a nozzle having an elongated tubular passage and an elastically deformable self-closing dispensing slit formed at the distal end of said nozzle, said nozzle being made of a relatively flexible and elastic material and being incorporated into said rigid body member by molding said body member around a major portion of an external surface of said nozzle along said elongated tubular passage.

2. A dispenser according to claim 1, wherein the slit is formed in a bulging head of the nozzle, which head is clear of the body and extends the shape thereof.

3. A dispenser according to claim 1, wherein the body member includes an upper surface for being pressed to dispense the fluid, and a peripheral skirt.

4. A dispenser according to claim 1, wherein the nozzle is made of an ethylene-vinyl acetate elastomer, and the body member is made of a polypropylene polymer.

5. A dispenser according to claim 1, wherein the body member has an axial duct into which the proximal end of said tubular passage of said nozzle opens non-axially.

6. A dispenser according to claim 5, wherein the nozzle is designed to make an obtuse angle with the said axial duct.

7. A dispenser according to claim 1, wherein the distal end of said tubular passage ends in a wall through which said self-closing slit partially passes.

8. A dispenser according to claim 7, wherein said wall has a dome-shaped interior face.

9. A dispenser according to claim 7, wherein said wall has a flat exterior face.

10. A method of manufacturing a manual dispenser for dispensing fluid substances under pressure and which automatically closes in the absence of pressure being applied thereto, wherein the manual dispenser has (1) a push-button for controlling an aerosol valve or pump; or (2) a stopper for a compressible flexible-walled container having an elastically deformable self-closing slit incorporated by moulding into a relatively rigid body comprising:
    molding a nozzle from a relatively flexible and elastic material to include an elongated tubular passage;
    transferring said nozzle into a body mold;
    molding a body member from a material which is relatively rigid in its finished state, said body member being molded around a major portion of an external surface of said nozzle in said body member; and
    forming an elastically deformable self-closing dispensing slit at the distal end of said nozzle.

11. A method according to claim 10, further comprising temporarily sealing off said elongated tubular passage with said body mold when molding said body member to avoid filling said elongated tubular passage with said relatively rigid material.

12. A method according to claim 10, further comprising forming said body member to have a lateral skirt for receiving a neck of a container holding the fluid to be dispensed.

13. A method according to claim 10, further comprising forming said body member to have a peripheral skirt and an axial tube for receiving an actuating stem of a container holding the fluid to be dispensed.

14. A method according to claim 13, wherein said body member is formed with an upper surface for being pressed to dispense the fluid.

* * * * *